United States Patent [19]

Bienfait

[11] Patent Number: 4,617,360

[45] Date of Patent: Oct. 14, 1986

[54] PROCESS FOR THE POLYMERIZATION OF α-OLEFINS

[75] Inventor: Charles Bienfait, Keerbergen, Belgium

[73] Assignee: Solvay & Cie., Brussels, Belgium

[21] Appl. No.: 392,135

[22] Filed: Jun. 25, 1982

Related U.S. Application Data

[63] Continuation of Ser. No. 911,814, Jun. 2, 1978, abandoned.

[30] Foreign Application Priority Data

Jun. 6, 1977 [LU] Luxembourg ............................ 77489

[51] Int. Cl.$^4$ ........................ C08F 4/02; C08F 10/00
[52] U.S. Cl. .................................... 526/114; 502/104; 502/117; 502/133; 502/134; 526/124; 526/125; 526/352; 526/908
[58] Field of Search ...................... 252/429 C, 431 R; 526/114, 124; 502/104, 133

[56] References Cited

U.S. PATENT DOCUMENTS

| | | | |
|---|---|---|---|
| 3,718,636 | 2/1973 | Stevens et al. | 526/124 |
| 3,901,863 | 8/1975 | Berger et al. | 526/124 |
| 4,071,674 | 1/1978 | Kashiwa et al. | 526/125 |
| 4,076,924 | 2/1978 | Toyota et al. | 526/125 |
| 4,089,808 | 5/1978 | Zucchini et al. | 526/125 |
| 4,109,071 | 8/1978 | Berger et al. | 526/114 |

FOREIGN PATENT DOCUMENTS

| | | | |
|---|---|---|---|
| 2324766 | 1/1974 | Fed. Rep. of Germany | 526/125 |
| 2440593 | 3/1975 | Fed. Rep. of Germany | 526/125 |
| 2455415 | 5/1975 | Fed. Rep. of Germany | 526/125 |
| 2461677 | 7/1975 | Fed. Rep. of Germany | 526/125 |
| 2615390 | 10/1976 | Fed. Rep. of Germany | 526/125 |
| 2259516 | 12/1976 | Fed. Rep. of Germany | . |
| 1309987 | 3/1973 | United Kingdom | 526/125 |

*Primary Examiner*—Edward J. Smith
*Attorney, Agent, or Firm*—Spencer & Frank

[57] ABSTRACT

Catalyst systems for the polymerization of α-olefins, as well as process for making and using the same, which comprises an organometallic compound, like an organoaluminum compound, and a solid catalyst complex formed by reacting together at least one compound selected from organic oxygen-containing and halogen-containing compounds of each of the metals of magnesium and titanium and at least one aluminum halide selected from organoaluminum chlorides of formula $AlR_nCl_{3-n}$ wherein R is an alkyl radical featuring at least 4 carbon atoms and $1 \leq n \leq 2$. Particles of polyolefins of higher average dimension are recoverable, when polymerized in the presence of such catalyst systems.

26 Claims, No Drawings

PROCESS FOR THE POLYMERIZATION OF α-OLEFINS

CROSS REFERENCE TO RELATED APPLICATION

This application is a continuation application of applicants' copending U.S. application Ser. No. 911,814 filed June 2, 1978, now abandoned.

BACKGROUND OF THE INVENTION

The present invention relates to an improved process for the polymerization of alpha-olefins. It also relates to solid catalyst complexes which can be used for the polymerization of alpha-olefins and to a process for preparing these complexes.

For the low pressure polymerization of olefins, it is known to use catalyst systems comprising a transition metal compound and an organometallic compound.

Catalyst systems in which one constituent is obtained by reacting together:

(1) an organic oxygen-containing metal compound or a metal halide, such as magnesium ethanolate or magnesium dichloride, (2) an organic oxygen-containing transition metal compound, such as titanium tetrabutylate, and (3) an aluminum halide, such as ethylaluminum dichloride are also known from Belgian Pat. Nos. 791,676, filed on Nov. 21, 1972 (corresponding to U.S. Pat. No. 3,901,863), and 799,977, filed on May 24, 1973 (corresponding to German Application No. 23 24 776) in the name of Solvay & Cie.

These catalyst systems are unique in the extremely important advantages which they exhibit. Thus, their activity and their productivity are very high. Their preparation is extremely simple and does not give rise to any pollutant by-product. Finally, the morphology of the polymer obtained permits continuous suspension polymerization using a very high relative proportion of polymer and therefore a very low relative amount of diluent to be treated before recycling.

However, the use of catalyst systems such as that described above also presents a serious disadvantage when they are used in a process in which the polymer is obtained directly in the form of particles. In fact, it has been found that, although of uniform particle size distribution, the polymers obtained directly as particles under the action of such catalyst systems contain a relatively high percentage of fine particles and have a relatively small average particle size.

The morphology of the particles of these polymers consequently presents problems during their drying, their storage, their transportation, their handling and their use in the known molding techniques. The attempts which have hitherto been made to increase the mean particle size of the polymers obtained directly by polymerization using the catalyst systems described above have not been completely successful. Thus, it has been found that a certain increase in the average diameter of the particles can be achieved by raising the temperature at which the aluminum halide is employed. However, this increase in the average diameter is unfortunately accompanied by a decrease in the apparent specific gravity and a substantial broadening of the particle size distribution.

SUMMARY OF THE INVENTION

A primary object of the present invention is therefore to provide a process for obtaining polyolefins having a reduced percentage of fine particles and a larger average particle size, without the abovementioned disadvantageous secondary effects. Furthermore, polyolefins are more and more frequently employed in the form of powders, that is to say in the form of dense and uniform particles of which a large percentage possess an average diameter of more than 250 microns and preferably more than 500 microns.

Polyolefin powders are particularly valuable for use in injection molding. Other valuable outlets for polyolefin powders are in the production of coatings by various techniques (electrostatic coating, coating by spraying and the like) and in their use as additives, mold-release agents, waxes, compositions for paints, binders for nonwoven textiles, and the like.

A further object of the present invention is the manufacture of polyolefin powders using polymerization processes which give polymers directly in the form of particles having the morphological characteristics of the powders used in the abovementioned processes.

Another object of the present invention is to provide a process for preparing solid catalytic complexes which can be used to polymerize alpha-olefins, and to provide new solid catalytic complexes for such polymerization.

Additional objects and advantages of the present invention will be set forth in part in the description which follows and in part will be obvious from the description or can be learned by practice of the invention. The objects and advantages are achieved by means of the processes, compositions and combinations particularly pointed out in the appended claims.

The present invention is based on the surprising discovery that a quite special class of the catalyst systems described above makes it possible to obtain polyolefins in the form of dense and hard particles having a large average diameter, a narrow particle size distribution and a high apparent specific gravity, without affecting the inherent advantages of these systems. These properties render them particularly suitable for use in the form of powders when they are being converted into finished articles.

The present invention, as embodied and broadly described, provides a process for the polymerization of alpha-olefins which is carried out in the presence of a catalyst system comprising an organometallic compound of a metal from groups Ia, IIa, IIb, IIIb and IVb of the Periodic Table and a solid catalyst complex prepared by reacting together:

(1) at least one compound (M) selected from organic oxygen-containing magnesium compounds and halogen-containing magnesium compounds, (2) at least one compound (T) selected from organic oxygen-containing titanium compounds and halogen-containing titanium compounds, and (3) at least one aluminum halide (A) selected from organoaluminum chlorides of the general formula $AlR_nCl_{3-n}$ in which R is an alkyl radical containing at least 4 carbon atoms and n is a number such that $1 \leq n \leq 2$.

The present invention further relates to the process of producing the solid catalytic complex by reacting together components (1), (2) and (3) and to the solid catalytic complex thus obtained.

It is to be understood that both the foregoing general description and the following detailed description are exemplary, but are not restrictive of the invention.

DETAILED DESCRIPTION OF THE INVENTION

The terms "organic oxygen-containing magnesium compounds" and "organic oxygen-containing titanium componds" are intended to denote all those compounds in which an organic radical of any type is bonded to the metal via the oxygen, that is to say all those compounds containing at least one sequence of metal/oxygen/organic radical bonds per metal atom. The organic radicals bonded to the metal via the oxygen are of any type. They are preferably selected from among radicals containing from 1 to 20 carbon atoms and, more particularly, from among those containing from 1 to 10 carbon atoms. The best results are obtained when these radicals contain from 2 to 6 carbon atoms. These radicals can be saturated or unsaturated, they can have a branched chain or a straight chain or they can be cyclic; they can also be substituted or possess hetero-atoms, such as silicon, sulfur, nitrogen or phosphorus, in their chain. They are preferably selected from among hydrocarbon radicals and, in particular, from among alkyl (linear or branched), alkenyl, aryl, cyclo-alkyl, arylalkyl, alkylaryl and acyl radicals and their substituted derivatives.

The terms "halogen-containing magnesium compounds" and "halogen-containing titanium compounds" are intended to denote all those compounds containing at least one metal/halogen bond. The halogen bonded to the metal can be fluorine, chlorine, bromine or iodine. The halogen is preferably chlorine.

Among all the organic oxygen-containing compounds and the halogen-containing compounds which are suitable, those which only contain metal/oxygen/organic radical bonds and/or metal/halogen bonds with the exclusion of any other bond are preferably used.

The solid catalyst complexes used in the present invention are prepared from reagents (1) which are magnesium compounds (M).

The organic oxygen-containing compounds (M) can contain other radicals in addition to the organic radicals bonded to the magnesium via the oxygen. These other radicals are preferably oxygen and inorganic radicals bonded to the metal via the oxygen, such as the $-OH$, $-(SO_4)_{\frac{1}{2}}$, $-NO_3$, $-(PO_4)_{\frac{1}{3}}$, $-(CO_3)_{\frac{1}{2}}$ and $ClO_4$ radicals. Organic radicals bonded directly to the magnesium by carbon can also be used.

Among the compounds (M) included in the family of the organic oxygen-containing magnesium compounds, there may be mentioned: alkoxides such as the methylate, ethylate, isopropylate, decanolate and cyclohexanolate; alkylalkoxides such as the ethylethylate, hydroxyalkoxides such as the hydroxymethylate; phenoxides such as the phenate, naphthenate, anthracenate, phenanthrenate and cresolate; optionally hydrated carboxylates such as the acetate, stearate, benzoate, phenylacetate, adipate, sebacate, phthalate, acrylate and oleate; organic nitrogen- and oxygen-containing compounds, that is to say compounds containing sequences of magnesium/oxygen/nitrogen/organic radical bonds, such as oximates, in particular the butyloximate, dimethylglyoximate and cyclohexyloximate, and hydroxamic acid salts and hydroxylamine salts, in particular the derivative of N-nitroso-N-phenylhydroxylamine; chelates, that is to say organic oxygen-containing compounds in which the magnesium possesses at least one sequence of normal bonds of the magnesium/oxygen/organic radical type and at least one coordination bond so as to form a heterocyclic ring in which the magnesium is included, such as enolates, and in particular the acetylacetonate, as well as the complexes obtained from phenol derivatives possessing an electron-donating group, for example in the ortho- or meta-position relative to the hydroxyl group, and in particular the 8-hydroxyquinolinate; and silanolates, that is to say compounds containing sequences of magnesium/oxygen/silicon/hydrocarbon radical bonds, such as the triphenylsilanolate.

Of course, the following organic oxygen-containing magnesium compounds also fall within the scope of the invention: compounds containing several different organic radicals, such as magnesium methoxyethylate, complex alkoxides and phenoxides of magnesium and another metal, such as $Mg[Al(OR)_4]_2$ and $Mg_3[Al(OR)_6]_2$ in which R represents an organic radical as defined above, and mixtures of two or more of the organic oxygen-containing magnesium compounds defined above.

Among the halogen-containing magnesium compounds (M), there may be mentioned: dihalides of the commercial type which are conventionally called "anhydrous" and which are in fact hydrated dihalides containing one molecule and less than one molecule of water per molecule of dihalide; the "commercial anhydrous" magnesium dichlorides are a typical example of these compounds; dihalides complexed with various electron donors, such as, for example, complexes with ammonia, such as $MgCl_2.6NH_3$ and $MgCl_2.2NH_3$, and complexes with alcohols, such as $MgCl_2.6CH_3OH$, $MgCl_2.6C_2H_5OH$ and $MgCl_2.6C_3H_7OH$; hydrated dihalides containing more than one molecule of water per molecule of dihalide, such as $MgCl_2.6H_2O$, $MgCl_2.4H_2O$ and $MgCl_2.2H_2O$; compounds containing, in addition to the magnesium/halogen bond, an inorganic radical bonded to the magnesium via the oxygen, such as a hydroxyl radical as in $Mg(OH)Cl$ and $Mg(OH)Br$; compounds containing, in addition to the magnesium/halogen bond (preferably the magnesium/chlorine bond), a magnesium/organic radical bond and preferably a magnesium/hydrocarbon radical bond (the hydrocarbon radical being as defined above) as in $Mg(C_2H_5)Cl$ and $Mg(C_6H_5)Cl$; products resulting from the hydrolysis of hydrated magnesium halides (preferably chlorides), provided these products still contain magnesium/halogen bonds; mixed compositions comprising halogen- and oxygen-containing magnesium compounds, typical examples of these compositions being basic magnesium halides (preferably chlorides) such as $MgCl_2.MgO.H_2O$, $MgCl_2.3MgO.7H_2O$ and $MgBr_2.3MgO.6H_2O$; and mixtures of two or more of the halogen-containing magnesium compounds defined above.

Finally, of course, the use of two or more compounds as defined above also falls within the scope of the present invention.

Likewise, the use of magnesium compounds containing both a magnesium/halogen bond and an organic radical which is as defined above and is bonded to the magnesium via the oxygen, also forms part of the invention. The compounds of this tyoe which give the best results are, of course, the chloroalkoxides and the chlorophenoxides, such as, for example, $Mg(OCH_3)Cl$, $Mg(OC_2H_5)Cl$ and $Mg(OC_6H_5)Cl$.

The best results are obtained when the magnesium compound (M) is a dialkoxide.

The reagents (2) used for preparing the catalyst complexes according to the invention are titanium compounds (T). Tetravalent titanium compounds are preferably used because they are more frequently liquids and, in any case, are more frequently and more readily soluble than those compounds in which this metal has a valency of less than 4. Those organic oxygen-containing titanium compounds (T) which can be used as reagents (2) can also be compounds comprising metal/oxygen bonds and condensed compounds containing sequences of metal/oxygen/metal bonds, provided that they also possess at least one sequence of metal/oxygen/organic radical bonds per molecule.

The organic oxygen-containing compounds (T) can be represented by the general formula $[TiO_x(OR)_{4-2x}]_n$ in which R represents an organic radical as defined above, x is a number such that $0 \leq x \leq 1.5$ and n is an integer. Those organic oxygen-containing compounds in which x is such that $0 \leq x \leq 1$ and n is such that $1 \leq n \leq 6$ are preferably used.

The use of organic oxygen-containing compounds (T) containing several different organic radicals also falls within the scope of the present invention.

Among the organic oxygen-containing titanium compounds (T), there may be mentioned: alkoxides such as $Ti(OC_2H_5)_4$, $Ti(O-nC_3H_7)_4$, $Ti(O-nC_4H_9)_4$, $Ti(O-iC_4H_9)_4$ and $Ti(O-tert.C_4H_9)_4$, phenoxides such as $Ti(OC_6H_5)_4$, oxyalkoxides such as $TiO(OC_2H_5)_2$, condensed alkoxides such as $Ti_2O(O-iC_3H_7)_6$, carboxylates such as $Ti(OOCCH_3)_4$, and enolates such as titanium acetylacetonate.

Among the halogen-containing titanium compounds (T), there may be mentioned: tetrahalides such as $TiCl_4$ and $TiBr_4$, halides complexed with various electron donors, such as $TiCl_4.6NH_3$, $TiCl_4.2C_5H_5N$ and $TiCl_4.C_4H_8O_2$, complex halides of titanium and an alkali metal, such as $K_2TiCl_6$ and $Na_2TiCl_6$, oxyhalides such as $TiOCl_2$, and halogenoalkoxides such as $Ti(OC_2H_5)_2Cl_2$, $Ti(OC_2H_5)_3Cl$, $Ti(O-iC_3H_7)_3Cl$ and $Ti(O-iC_4H_9)_2Cl_2$.

The best results are obtained with titanium tetraalkoxides.

It is self-evident that the use of several different titanium compounds (T) also falls within the scope of the present invention.

For the manufacture of polymers of alpha-olefins having a broad molecular weight distribution, it can be advantageous to also use at least one additional transition metal compound (reagent (4)) for preparing the solid catalyst complexes of the invention. This additional compound is then a compound (Z) selected from among organic oxygen-containing zirconium compounds and halogen-containing zirconium compounds.

These compounds (Z) correspond in all respects to the definitions and limitations stated previously in connection with the compounds (T).

By way of examples of zirconium compounds (Z) which can be used, there may be mentioned: alkoxides such as $Zr(OC_4H_9)_4$, phenoxides such as $Zr(OC_6H_5)_4$, oxyalkoxides such as $Zr[OZr(OC_2H_5)_3]_4$, carboxylates such as $Zr(OOCCH_3)_4$ and $Zr(C_2O_4)_2$, enolates such as zirconium acetylacetonate, tetrahalides such as $ZrCl_4$ and $ZrF_4$, halides complexed with various electron donors, such as $ZrCl_4.8NH_3$, $ZrCl_4.4NH_3$ and $ZrCl_4.4C_5H_5N$, oxyhalides such as $ZrOF_2$ and $ZrOCl_2.8H_2O$, and halogenoalkoxides such as $Zr(OC_4H_9)Cl_3$.

The best results are obtained with zirconium tetraalkoxides and zirconium tetrachloride.

In this particular embodiment of the invention, these various compounds (T) and (Z) are preferably employed as described in U.S. patent application Ser. No. 675,320, now U.S. Pat. No. 4,109,071, the content of which is incorporated herein by reference.

The solid catalyst complexes which can be used according to the present invention are ultimately prepared from reagents (3) which must be organoaluminum chlorides of the general formula $AlR_nCl_{3-n}$ in which R and n are as defined above in connection with reagents (3) of the present invention.

These reagents (3) are preferably organoaluminum chlorides corresponding to the above general formula in which R is a linear or branched alkyl radical containing from 4 to 18 carbon atoms and in which n has a value of 1 to 1.5.

When the alkyl radical is branched, there is preferably a single, short side chain which is in particular a methyl group. The branched radical is preferably a single "iso" radical, that is to say a radical in which the substituent group is in the α-position relative to the terminal carbon of the radical.

The best results are obtained when the organoaluminum chlorides correspond to the above formula in which R is a linear or branched alkyl radical containing from 4 to 18 carbon atoms and in which n has the value 1. Organic chlorides corresponding to this definition are, for example, n-butyl- and iso-butyl-aluminum, n-octyl- and isooctyl-aluminum, n-hexadecylaluminum and n-octadecylaluminum dichlorides. One organoaluminum chloride which is very particularly preferred and easily accessible is isobutylaluminum dichloride $[Al(iC_4H_9)Cl_2]$.

The choice of the reagent (3) is an essential characteristic of the present invention. In fact, it is the nature of this reagent which, surprisingly, gives rise to the considerable improvement in the morphology of the polyolefins obtained in accordance with the process of the present invention.

The use of several different organoaluminum chlorides is not excluded from the scope of the present invention, provided that the alkyl radicals present in each of them contain at least 4 carbon atoms.

These organoaluminum chlorides can be prepared, optionally "in situ" and preferably prior to their use, especially by mixing the corresponding trialkylaluminum compounds with aluminum chlorides containing more chlorine than the chloride which it is desired to obtain. It is self-evident that the scope of the invention is not limited to the use of organoaluminum chlorides which consist exclusively of compounds corresponding to the abovementioned general formula, but that it extends to technical-grade products which contain, in addition to a substantial proportion of these compounds, by-products such as the reagents which have been used for their preparation. However, these products preferably contain at least 80% by weight of organoaluminum chlorides corresponding to the general formula.

The solid catalyst complexes of the invention can be prepared starting from the reagents (1), (2), (3) and optionally (4) above in accordance with all the methods which induce a chemical reaction between them.

The reaction for forming the complexes is preferably carried out in a liquid medium. In order to do this, the reaction can be carried out in the presence of a diluent, especially when the reagents are not themselves liquid under the operating conditions or when there is an insufficient amount of liquid reagents. When a diluent is used, it is generally selected from among those which can dissolve at least one of the reagents, and in particular from among alkanes, cycloalkanes and aromatic hydrocarbons containing from 4 to 20 carbon atoms, such as, for example, isobutane, hexane, heptane, cyclohexane, benzene, toluene and the like. Polar solvents, such as ethers and alcohols containing from 1 to 12 carbon atoms (for example ethanol and diethyl ether), tetrahydrofuran, pyridine, methylene chloride and the like, can also be used. When a diluent which dissolves at least one of the reagents is used, the total concentration of the reagent or reagents dissolved is preferably greater than 5% by weight, and preferably greater than 20% by weight, relative to the diluent.

In all cases, whether a diluent is used or whether there is a sufficient amount of liquid reagents under the operating conditions, the reaction medium is preferably in the form of a relatively viscous liquid in which solid matter can be present in disperse form.

The reagents are added in any order. The reagents (3) can, in particular, be introduced into the reaction medium at any time during the preparation of the solid catalyst complex.

However, for reasons of convenience, these solid catalyst complexes are preferably prepared in accordance with one of the methods below:

(1) The reagent (1) and the reagent (2) are brought together by mixing them gradually or by adding the one to the other; the reagent (3) is then added gradually;

(2) the reagent (2) and the reagent (3) are mixed, preferably rapidly, and the reagent (1) is then added; or (3) the three reagents are mixed simultaneously and gradually.

Most preferably, the reagent (3) should be added at the end of the preparation of the catalyst complexes, that is to say, at the earliest, while the reagents (1) and (2) are being brought together. The best results are obtained when the reagent (3) is introduced after the total amounts of the reagents (1) and (2) have been brought together.

The methods of preparation of the solid catalyst complexes according to the present invention also extend to the use of magnesium, an organic hydroxylic compound, such as an alcohol, and the reagent (2), in place of the preformed reagents (1) and (2).

The preparation of similar catalyst complexes is described in Belgian Pat. No. 819,609 filed on Sept. 6, 1974, in the name of Solvay & Cie., the content of which can be applied in every respect to the present particular embodiment of the invention.

The pressure under which the preparation of the catalyst complexes is carried out, the rate of addition of the reagents and the duration of their contact are not critical factors. For reasons of convenience, the reaction is generally carried out at atmospheric pressure; the rate is generally chosen so as not to cause a sudden heating of the reaction medium due to a possible autoacceleration of the reaction; the duration can generally vary between 5 minutes and 12 hours. The reaction medium is generally stirred so as to assist its homogenization throughout the duration of the reaction. The reaction can be carried out continuously or discontinuously.

The temperature at which the reagent (1) and the reagent (2) are brought together is not critical. For reasons of convenience, it is generally chosen between 200° and −50° C. and preferably between 150° C. and ambient temperature (25° C.). On the other hand, when the catalyst complexes are prepared by reacting the reagent (3) with the mixture which results from bringing the reagent (1) and reagent (2) together, it is found, surprisingly, that the temperature at which this reaction is carried out exerts an influence on the morphology of the polyolefin powder which is finally obtained. All other conditions being equal, it is possible to increase the favorable action of the organoaluminum chloride according to the invention on the size, hardness and size distribution of the polyolefin particles and on the apparent specific gravity of the polyolefin by suitably choosing the temperature at which this reagent (3) is added to the product which results from the prior mixing of the reagents (1) and (2). This temperature, which is generally greater than 0° C. and less than the boiling point of the organoaluminum chloride at ordinary pressure, is preferably between 30° and 65° C. The best results are obtained between about 45° and 60° C. The preparation of the catalyst complexes according to the present invention can advantageously be terminated by an aging treatment carried out at a temperature which is generally equivalent to or greater than that at which the reaction with the reagent (3) takes place, for a noncritical period of time generally ranging from 5 minutes to 12 hours and preferably for at least 1 hour.

The amounts of compound (M), compound (T) and organoaluminum chloride (A) which are preferably to be employed are specified below.

The amount of the compound or compounds (T) to be used is defined relative to the total amount of the compound or compounds (M) used. It can vary within wide limits. In general, it is between 0.01 and 10 g. atoms (gram atoms) of titanium in the compound (T) per g. atom of magnesium present in the compound (M). It has been observed that the performances of the catalyst complexes of the present invention are optimal when a ratio of between 0.025 and 5 g. atoms of titanium per g. atom of magnesium is used The best compromise between the productivity (that is to say the amount of polymer produced relative to the amount of catalyst complex used) and the specific activity (that is to say the amount of polymer produced relative to the amount of titanium and/or zirconium employed) of the catalyst complexes, on the one hand, and the morphology of the polyolefin obtained, on the other hand, is obtained when this ratio varies between about 0.10 and 2 g. atoms per g. atom.

The amount of organoaluminum chloride (A) to be employed is also defined relative to the total amount of the compound or compounds (M) used. It can also vary within wide limits. In general, it is between 1 and 100 mols of organoaluminum chloride per mol of compound (M). This amount is preferably between 1 and 20 mols per mol. The best compromise (as defined above) is obtained when this ratio is between 2 and 10 mols per mol.

The catalyst complexes according to the present invention are solid. They are insoluble in the alkanes and cycloalkanes which can be used as diluents. They can be used for polymerization in the form in which they are obtained without being separated from the reaction medium used for their preparation. However, they can be separated from this reaction medium in accordance with any known method, especially when they are prepared in the presence of a polar solvent. When the reaction medium is liquid, it is possible to use, for example, filtration, decantation or centrifugation.

After separation, the catalyst complexes can be washed so as to remove the excess reagents with which they could still be impregnated. Any inert diluent, for example those which can be used as constituents of the reaction medium, such as alkanes and cycloalkanes, can be used for this washing. After washing, the catalyst complexes can be dried, for example by sweeping with a stream of dry nitrogen or in vacuo.

The mechanism of the reaction for the formation of the catalyst complexes of the invention is not known. Elementary analysis of the catalyst complexes, after separation and washing, shows that they are indeed chemically bonded complexes produced by chemical reactions, and not merely as a result of mixing operations or adsorption phenomena. In fact, it is impossible to dissociate one or other of the constituents of these complexes by using purely physical separation methods.

The catalyst systems according to the invention also comprise an organometallic compound which is used as an activator. Organometallic compounds of the metals from groups Ia, IIa, IIb, IIIb and IVb of the Periodic Table, such as organometallic lithium, magnesium, zinc, aluminum or tin compounds, are used. The best results are obtained with organoaluminum compounds.

It is possible to use as the organometallic activator totally alkylated compounds in which the alkyl chains contain from 1 to 20 carbon atoms and are linear or branched, such as, for example, n-butyllithium, diethylmagnesium, diethylzinc, tetraethyltin, tetrabutyltin and trialkylaluminum compounds.

It is also possible to use as the organometallic activator alkylmetal hydrides in which the alkyl radicals also contain from 1 to 20 carbon atoms, such as diisobutylaluminum hydride and trimethyltin hydride. Alkylmetal halides in which the alkyl radicals also contain from 1 to 20 carbon atoms, such as ethylaluminum sesquichloride, diethylaluminum chloride and diisobutylaluminum chloride, are also suitable.

It is also possible to use as the activator organoaluminum compounds obtained by reacting trialkylaluminum compounds or dialkylaluminum hydrides, the radicals of which contain from 1 to 20 carbon atoms, with diolefins containing from 4 to 20 carbon atoms; more particularly, the so-called isoprenylaluminum compounds can also be used.

Trialkylaluminum compounds in which the alkyl chains are linear and contain from 1 to 18 carbon atoms are preferably used for the manufacture of certain grades of polyolefins. In fact, it is found, completely surprisingly, that when these compounds are used as activators for the catalyst complexes prepared according to the invention, that is to say, prepared by employing a reagent (3) which is an organoaluminum chloride as defined above in connection with the present invention, the molecular weight distributions of the polyolefins obtained are broader, all other conditions being equal, than those of the polyolefins obtained in the presence of catalyst complexes prepared by employing the usual reagents (3) (ethylaluminum dichloride).

This unexpected result (the broadened molecular weight distribution) is particularly advantageous when the polyolefin is intended for the manufacture of large articles, such as drums and large containers, by extrusion-blowing techniques.

The process of the present invention is applied to the polymerization of terminally unsaturated olefins, the molecule of which contains from 2 to 20, and preferably from 2 to 6, carbon atoms, such as ethylene, propylene, butene-1, 4-methylpentene-1 and hexene-1. It is also applied to the copolymerization of these olefins both with one another and with diolefins preferably containing from 4 to 20 carbon atoms. These diolefins can be unconjugated aliphatic diolefins such as 1,4-hexadiene, monocyclic diolefins such as 4-vinylcyclohexene, 1,3-divinylcyclohexane, cyclopentadiene or cyclo-1,5-octadiene, alicyclic diolefins having an endocyclic bridge, such as dicyclopentadiene or norbornadiene, and conjugated aliphatic diolefins such as butadiene and isoprene.

The process of the present invention is applied particularly well to the manufacture of ethylene homopolymers and of copolymers containing at least 90 mol % and preferably 95 mol %, of ethylene.

The polymerization can be carried out in accordance with any known process, namely in solution or in suspension in a solvent or in a hydrocarbon diluent, or also in the gas phase. For the processes in solution or in suspension, solvents or diluents are used which are analogous to those employed for the preparation of the catalyst complex. These solvents or diluents are preferably alkanes or cycloalkanes, such as isobutane, pentane, hexane, heptane, cyclohexane, methylcyclohexane or their mixtures. The polymerization can also be carried out in the monomer or one of the monomers which is kept in the liquid state. It is particularly advantageous to carry out polymerization processes in which the polymers are generated directly in the form of particles. Among these processes, preference is given to the polymerization processes in suspension in a hydrocarbon diluent which is liquid under the polymerization conditions, which processes, after separation of the unreacted monomer and the diluent, produce, in the presence of the catalyst systems of the invention, polymer particles which have the morphological characteristics of the powders used in the abovementioned conversion processes.

The polymerization pressure is generally between atmospheric pressure and 100 kg/cm$^2$ and is preferably 50 kg/cm$^2$. The temperature is generally chosen between 20° and 200° C. It is preferably between 60° and 120° C. so as to obtain the polymer directly in the form of a solid. No degradation of the morphology of the polyolefin particles obtained in the presence of the catalyst systems of the present invention is observed when the polymerization temperature is lowered within this preferred zone. On the other hand, when solid catalyst complexes are prepared from the usual reagents (3) of the prior art, it is found that lowering the polymerization temperature exerts a disadvantageous effect on the morphology of the polyolefin obtained. The disadvantageous effect is that the polyolefin particles are finer and less hard.

The polymerization can be carried out continuously or discontinuously.

The organometallic compound and the catalyst complex can be added to the polymerization medium separately. They can also be brought together, at a temperature of between −40° and 80° C. and for a period of time which can range up to 2 hours, before introducing them into the polymerization reactor. They can also be brought together in several stages or it is also possible to add part of the organometallic compound before introduction into the reactor or, again, several different organometallic compounds can be added.

The total amount of organometallic compound employed can vary within wide limits. It is generally between 0.02 and 50 mmols per $dm^3$ of solvent, of diluent or of reactor volume, and it is preferably between 0.5 and 2.5 mmols per $dm^3$.

The amount of catalyst complex employed is determined as a function of the proportion of titanium in the catalyst complex. It is generally chosen so that the concentration is between 0.001 and 2.5, and preferably between 0.01 and 0.25, mg. atom of titanium per $dm^3$ of solvent, of diluent or of reactor volume (mg. atom = milligram atom).

The ratio of the amount of organometallic compound to the amount of catalyst complex is also not critical. It is generally chosen so that the ratio of organometallic compound/titanium, expressed in mol/g. atom, is greater than 1 and preferably greater than 10.

The average molecular weight and hence the melt index of the polymers manufactured in accordance with the process of the invention can be controlled by the addition to the polymerization medium of one or more agents for modifying the molecular weight, such as hydrogen, zinc or diethyl cadmium, alcohols or carbon dioxide.

The specific gravity of the homopolymers manufactured in accordance with the process of the invention can also be controlled by the addition to the polymerization medium of an alkoxide of a metal from groups IVa and Va of the Periodic Table. Thus, it is possible to manufacture polyethylenes having a specific gravity which is intermediate between that of the conventional high-density polyethylenes and that of the polyethylenes prepared in accordance with a high-pressure process.

Among the alkoxides which are suitable for this control, titanium and vanadium alkoxides in which the radicals each contain from 1 to 20 carbon atoms are particularly efficient. Among these, there may be mentioned $Ti(OCH_3)_4$, $Ti(OC_2H_5)_4$, $Ti[OCH_2CH(CH_3)_2]_4$, $Ti(OC_8H_{17})_4$ and $Ti(OC_{16}H_{33})_4$.

The process of the present invention makes it possible to manufacture polyolefins with very high productivities. Thus, in the homopolymerization of ethylene, the productivity, expressed in grams of polyethylene per gram of catalyst complex employed, normally exceeds 10,000 and in certain cases 20,000. The activity relative to the amount of transition metals present in the catalyst complex is also very high. In the homopolymerization of ethylene, it normally exceeds 200,000, again expressed in grams of polyethylene per g. atom of titanium employed. In the most favorable cases, it is greater than 500,000. In all cases, it is at least at the level of the activities imparted to the preferred catalyst systems of the prior art which comprise solid catalyst complexes prepared from ethylaluminum dichloride as reagent (3), and it is frequently even greater than these activities.

For this reason, the proportion of catalyst residues in the polymers manufactured in accordance with the process of the present invention is extremely low. More particularly, the proportion of residual transition metal is exceedingly small. Now, it is the derivatives of the transition metals which are especially troublesome in the catalyst residues because of the colored complexes which they form with the phenol antioxidants usually employed in the polyolefins and because of the toxic nature of the said metals.

In the process of the present invention, the proportion of troublesome residues in the polymers is so small that it is possible to omit the purification treatment (for example a treatment with alcohol) which is obligatory when the proportion of catalyst residues is high and which is an expensive operation in raw materials and energy and entails considerable capital assets.

The polyolefin powders manufactured according to the present invention are therefore characterized by a remarkable morphology and can be employed in this form. This is the case particularly of the powders of ethylene polymers. However, the polyolefins obtained according to the present invention can be granulated and employed in the form of granules in accordance with the conventional molding techniques, namely by injection, extrusion, extrusion-blowing, calendering and the like.

The examples which follow are intended to illustrate the invention and do not limit the scope thereof.

EXAMPLES 1 TO 4 AND COMPARISON EXAMPLE 5R

The following reagents are used:
(1) Magnesium ethylate $Mg(OC_2H_5)_2$ sold by Dynamit Nobel,
(2) Titanium tetrabutylate $Ti(O-nC_4H_9)_4$ sold by Dynamit Nobel, and
(3) various organoaluminum chlorides defined below.

A stock solution (S) is prepared by heating together 9 mols of the reagent (2) and 4.5 mols of the reagent (1) at 150° C. for 2 hours, while stirring. The atomic ratio of Ti/Mg in this mixture therefore has a value of about 2 g. atoms/g. atom. 500 ml of the stock solution (S), in which the reagent (1) has almost completely dissolved and which has been cooled beforehand, are treated with 1,000 ml of hexane so as to obtain a solution (V) containing about 500 g of stock solution (S)/liter of solution (V).

The various organoaluminum chlorides employed are:
in Example 1, isobutylaluminum dichloride Al-($iC_4H_9$)$Cl_2$;
in Example 2, n-butylaluminum dichloride Al($nC_4H_9$)$Cl_2$;
in Example 3, n-octylaluminum dichloride Al($nC_8H_{17}$)$Cl_2$;
in Example 4, n-octadecylaluminum dichloride Al($nC_{18}H_{37}$)$Cl_2$; and
in Comparison Example 5R, ethylaluminum dichloride Al($C_2H_5$)$Cl_2$.

The organoaluminum chlorides employed according to Examples 1 and 5R are commercial products sold by Schering.

The organoaluminum chlorides employed according to Examples 2, 3 and 4 were prepared in a known manner by reacting the corresponding trialkylaluminum compound with aluminum trichloride.

The various organoaluminum chlorides are employed in the form of solutions in hexane which contain 400 g of organoaluminum chloride/liter of solution. They are added gradually in the course of about 90 minutes, at a temperature of about 50° C. and while stirring, to portions of stock solutions (S) which have been diluted as indicated above [solution (V)]. When this addition has ended, the reaction mixture is aged for 1 hour at 60° C. The amount of organoaluminum chloride employed in each of the examples is such that the molar ratio of organoaluminum chloride/magnesium ethylate has a value of about 10.

The catalyst complexes formed in this way are used as they are, without being separated from their reaction medium, in polymerization experiments of which the general conditions are defined below.

Fixed amounts of catalyst complex and 0.5 mmol of triethylaluminum are introduced into a 1.5 liter autoclave containing 0.5 liter of hexane. The temperature of the autoclave is then brought to about 85° C. Ethylene (e) the amount of suspension of catalyst complex employed is expressed indirectly by the weight, in mg, of titanium which it contains;

(f) HLMI represents the melt index of the polyethylene under high load, expressed in g/10 minutes and measured in accordance with ASTM-D Standard Specification 1238-70; and (g) the ratio of HLMI/MI represents the spread of the molecular weight distribution. It increases as the distribution broadens.

TABLE 1

| | EXAMPLE No. | | | | |
|---|---|---|---|---|---|
| | 1 | 2 | 3 | 4 | 5 R |
| Nature of the organoaluminum chloride (reagent (3)) | Al(iC$_4$H$_9$)Cl$_2$ | Al(nC$_4$H$_9$)Cl$_2$ | Al(nC$_8$H$_{17}$)Cl$_2$ | Al(nC$_{18}$H$_{37}$)Cl$_2$ | Al(C$_2$H$_5$)Cl$_2$ |
| Amount of catalyst complex used (mg Ti) (to ± 10%) | 0.6 | 0.6 | 0.5 | 0.6 | 0.5 |
| Amount of polyethylene (PE) collected (g) | 83 | 113 | 70 | 96 | 62 |
| Specific activity (g PE/h × g Ti × kg/cm$^2$ C$_2$H$_4$) | 13,800 | 18,800 | 14,500 | 16,000 | 12,900 |
| MI | 0.88 | 3.76 | 3.06 | 3.18 | 0.62 |
| ASG before grinding | 0.33 | 0.35 | 0.37 | 0.31 | 0.31 |
| ASG after grinding (kg/dm$^3$) | 0.35 | 0.35 | 0.36 | 0.33 | 0.33 |
| H (%) | 94 | 100 | about 100 | 94 | 94 |
| P total percentages of particles having a mean diameter of | | | | | |
| less than 44 microns | 0 | 0 | 0 | 0 | 0 |
| less than 100 microns | 2 | 1 | 2 | 0.5 | 2 |
| less than 125 microns | 3.5 | 2 | 5 | 1.5 | 7 |
| less than 250 microns | 20 | 36 | 19 | 37 | 60 |
| greater than 500 microns | 58 | 33 | 55 | 16 | 6 |
| Average diameter of the particles (mm) | 0.54 | 0.33 | 0.51 | 0.30 | 0.22 | is introduced under a partial pressure of 10 kg/cm$^2$ and hydrogen is introduced under a partial pressure of 4 kg/cm$^2$g.

The polymerization is allowed to proceed for 1 hour, while stirring, the total pressure being kept constant by the continuous addition of ethylene. After 1 hour, the autoclave is degassed and the polyethylene thus manufactured is collected.

Table I indicates the particular conditions of each experiment, the results obtained and the morphological characteristics of the polyethylenes manufactured.

In this table and in the examples which follow:

(a) ASG means the "apparent specific gravity" of the polymer and is expressed in kg/dm$^3$;

(b) H means the "hardness" of the polymer and is expressed in per cent. This hardness is estimated by measuring the ASG of the polymer in a known manner by a flow method, before and after grinding for a period of 6 seconds in a blade grinder revolving at more than 20,000 revolutions/minute. The hardness is given by the empirical formula $$\frac{ASG \text{ before grinding}}{ASG \text{ after grinding}} \times 100 \ (\%)$$

The higher the value obtained, the harder are the polymer particles;

(c) the particle size distribution P of the polymer is also expressed in per cent and is measured after grinding under the conditions defined above;

(d) MI represents the melt index of the polyethylene, expressed in g/10 minutes and measured in accordance with ASTM-D Standard Specification 1238-70;

Table I shows that the use of the organoaluminum chlorides corresponding to the definition of the invention as reagents (3) (Examples 1 to 4) leads, with improved catalytic activities, to polyethylenes which contain a substantially greater proportion of large particles than that present in the polyethylenes obtained with the usual reagent (3) of the prior art (Example 5R).

EXAMPLES 6 AND 7R

Example 7R is given by way of comparison.

Catalyst complexes are prepared in accordance with the preceding examples except that the reagents (2) and (1) are mixed so that the atomic ratio of Ti/Mg is about 1.2 g. atoms/g. atom, so that the amount of organoaluminum chloride employed is such that the molar ratio of organoaluminum chloride/magnesium ethylate has a value of about 3.5, and so that the organoaluminum chloride is added at a temperature of about 30° C.

In Example 6, the catalyst complex is prepared by employing isobutylaluminum dichloride as the organoaluminum chloride.

In Example 7R, the catalyst complex is prepared by employing ethylaluminum dichloride as the organoaluminum chloride.

The catalyst complexes obtained are used, in the form of suspensions in the medium which was used to prepare them, in order to carry out experiments on the polymerization of ethylene under absolutely identical general conditions to those described in the preceding examples.

The morphological characteristics of the polyethylenes obtained are summarized in Table II.

TABLE II

| EXAMPLE No. | 6 | 7 R |
|---|---|---|
| Nature of the organoaluminium chloride (reagent (3)) | Al(iC$_4$H$_9$)Cl$_2$ | Al(C$_2$H$_5$)Cl$_2$ |
| ASG of the polyethylene | | |
| before grinding | 0.35 | 0.34 |
| after grinding (kg/dm$^3$) | 0.37 | 0.38 |
| H (%) | 94 | 89 |
| P total percentages of particles having a mean diameter of | | |
| less than 44 microns | 0 | 0 |
| less than 100 microns | 2 | 7 |
| less than 125 microns | 8 | 20 |
| less than 250 microns | 27 | 77 |
| greater than 500 microns | 46 | 5 |
| Average diameter of the particles (mm) | 0.41 | 0.17 |

It is therefore seen that the advantageous results of the use of organoaluminum chlorides (reagents (3)) corresponding to the definition of the invention are still obtained despite significant changes in the molar ratios of the reagents.

EXAMPLES 8 TO 12

Catalyst complexes are prepared in accordance with Examples 1 to 5R, employing isobutylaluminum dichloride as the organoaluminum chloride.

However, the solution of this reagent in hexane is added to the diluted stock solution (V) at variable temperatures. Experiments on the polymerization of ethylene are carried out with the catalyst complexes thus prepared, under the general conditions described in Examples 1 to 5R. The particular conditions of each experiment, the results obtained and the morphological characteristics of the polyethylenes manufactured are summarized in Table III.

TABLE III

| | EXAMPLE No. | | | | |
|---|---|---|---|---|---|
| | 8 | 9 | 10 | 11 | 12 |
| Temperature at which the organoaluminium chloride (reagent (3)) is added (°C.) | 0 | 30 | 45* | 60 | under reflux |
| Amount of catalyst complex used (mg Ti) (to ± 10%) | 0.6 | 0.6 | 0.6 | 0.6 | 0.7 |
| Amount of polyethylene (PE) collected (g) | 62 | 82 | 66 | 95 | 97 |
| Specific activity (g PE/h × g Ti × kg/cm$^2$ C$_2$H$_4$) | 9,700 | 12,800 | 10,300 | 14,800 | 13,500 |
| MI | 0.57 | 0.73 | 0.64 | 3.8 | 1.25 |
| ASG before grinding | 0.24 | 0.29 | 0.32 | 0.31 | 0.32 |
| ASG after grinding (kg/dm$^3$) | 0.32 | 0.32 | 0.33 | 0.33 | 0.34 |
| H (%) | 75 | 91 | 97 | 94 | 94 |
| P total percentages of particles having a mean diameter of | | | | | |
| less than 44 microns | 0 | 0 | 0 | 0 | 0 |
| less than 100 microns | 0 | 0 | 0 | 0 | 1 |
| less than 125 microns | 1 | 0.5 | 0.5 | 0.5 | 3 |
| less than 250 microns | 52 | 15 | 13 | 5 | 20 |
| greater than 500 microns | 1 | 30 | 42 | 65 | 42 |
| Average diameter of the particles (mm) | 0.25 | 0.40 | 0.45 | 0.60 | 0.41 |

*The subsequent ageing is carried out at 45° C. instead of 60° C.

It is therefore seen that, in the particular case of the use of isobutylaluminum dichloride as reagent (3), the results relating to the morphology of the polymer and the catalytic performances are superior when the temperature at which this compound is employed is greater than 30° C. Furthermore, an increase in the temperature at which this compound is added does not cause a decrease in the ASG or a broadening of the particle size distribution.

EXAMPLES 13 TO 15 AND COMPARISON EXAMPLES 16R TO 18R

Catalyst complexes are prepared in accordance with Examples 1 to 5R, employing isobutylaluminum dichloride, at 50° C., as the organoaluminum compound in Examples 13 to 15, and ethylaluminum dichloride, at 30° C., in Examples 16R to 18R.

Experiments on the polymerization of ethylene are carried out with the catalyst complexes thus prepared, under the general conditions described in Examples 1 to 5R, but employing the following organoaluminum compounds as activators for the catalyst systems:

Triethylaluminum Al(C$_2$H$_5$)$_3$ in Examples 13 and 16R; trioctylaluminum Al(C$_8$H$_{17}$)$_3$ in Examples 14 and 17R; and trioctadecylaluminum Al(C$_{18}$H$_{37}$)$_3$ in Examples 15 and 18R.

The particular conditions of each experiment, the results obtained and the characteristics of the polyethylenes manufactured are summarized in Table IV.

TABLE IV

| | EXAMPLE No | | | | | |
|---|---|---|---|---|---|---|
| | 13 | 14 | 15 | 16 R | 17 R | 18 R |
| Nature of the organoaluminium chloride (reagent (3)) | Al(iC$_4$H$_9$)Cl$_2$ | | | Al(C$_2$H$_5$)Cl$_2$ | | |
| Nature of the organoaluminium compound (activator) | Al(C$_2$H$_5$)$_3$ | Al(C$_8$H$_{17}$)$_3$ | Al(C$_{18}$H$_{37}$)$_3$ | as 13 | as 14 | as 15 |
| Amount of catalyst complex used (mg Ti) | 0.6 | 0.6 | 0.6 | 0.7 | 0.7 | 0.7 |
| Amount of PE collected (g) | 55 | 142 | 79 | 78 | 90 | 116 |
| Specific activity (g PE/h × g Ti × kg/cm$^2$ C$_2$H$_4$) | 9,800 | 25,400 | 14,100 | 11,500 | 26,500 | 17,000 |

TABLE IV-continued

| | EXAMPLE No | | | | | |
|---|---|---|---|---|---|---|
| | 13 | 14 | 15 | 16 R | 17 R | 18 R |
| MI | 0.52 | 0.78 | 0.11 | 0.79 | 0.54 | 0.20 |
| HLMI | 17.52 | 32.72 | 5.40 | 24.32 | 19.35 | 8 |
| Ratio of HLMI/MI | 33 | 42 | 49 | 30 | 35 | 38 |
| ASG before grinding | 0.33 | 0.20 | 0.31 | 0.32 | 0.25 | 0.27 |
| ASG after grinding (kg/dm$^3$) | 0.35 | 0.26 | 0.31 | 0.35 | 0.31 | 0.32 |
| H (%) | 94 | 77 | 100 | 91 | 80 | 84 |
| P total percentages of particles having a mean diameter of | | | | | | |
| less than 44 microns | 0 | 0 | 0 | 0 | 0 | 0 |
| less than 100 microns | 1.5 | 1 | 1 | 2 | 1 | 0.5 |
| less than 125 microns | 4.5 | 3 | 3.5 | 5.5 | 2.5 | 1.5 |
| less than 250 microns | 15 | 20 | 20 | 71 | 56 | 43 |
| greater than 500 microns | 65 | 65 | 44 | 7 | 2.5 | 5 |
| Average diameter of the particles (mm) | 0.56 | 0.40 | 0.46 | 0.22 | 0.22 | 0.25 |

Examination of this table makes it possible to conclude that, when organoaluminum chlorides (reagents (3)) according to the present invention are employed, the polyethylenes obtained under strictly identical polymerization conditions possess, in addition to their more advantageous morphology, broader molecular weight distributions than when the catalyst complexes are prepared with the preferred reagent (3) of the prior art.

It will be understood that the above description of the present invention is susceptible to various modifications, changes and adaptations, and the same are intended to be comprehended within the meaning and range of equivalents of the appended claims.

What is claimed is:

1. In a process for the polymerization of ethylene which is carried out in the presence of an organoaluminum compound and a solid catalyst complex prepared by reacting together:
   (1) at least one compound (M) selected from organic oxygen-containing magnesium compounds which only contain metal/oxygen/organic radical bonds,
   (2) at least one compound (T) selected from organic oxygen-containing titanium compounds having the general formula $(TiO_x(OR)_{4-2x})_n$ in which R represents an organic radical, x is a number such that $0 \leq x \leq 1.5$ and n is an integer, and
   (3) at least one aluminum halide (A), said aluminum halide (A) being employed at the end of the preparation, the improvement wherein the aluminum halide is an organoaluminum chloride of the general formula $AlR_nCl_{3-n}$ in which R is an isobutyl radical and n is 1.

2. Process according to claim 1, wherein the compound (M) is selected from magnesium dialkoxides.

3. Process according to claim 1, wherein the solid catalyst complex is prepared by reacting together in addition to the compound (M), the compound (T) and the aluminum halide (A), a compound (Z) selected from organic oxygen-containing zirconium compounds and halogen-containing zirconium compounds.

4. Process according to claim 3, wherein the compound (Z) is selected from zirconium tetraalkoxides and zirconium tetrachloride.

5. Process according to claim 1, wherein the temperature of the reaction medium while the organoaluminum chloride is being employed is greater than 0° C. and less than its boiling point at atmospheric pressure.

6. Process according to claim 5, wherein the temperature of the reaction medium is between 30° and 65° C.

7. Process according to claim 1, wherein the amounts of compounds (T) and (M) employed in order to prepare the solid catalyst complex are such that the ratio of the amount of titanium to the amount of magnesium is between 0.025 and 5 g. atom titanium/g. atom magnesium.

8. Process according to claim 1, wherein the amounts of compound (M) and organoaluminum chloride (A) employed in order to prepare the solid catalyst complex are such that the ratio of the amount of organoaluminum chloride to the amount of compound (M) is 1 and 20 mols of organoaluminum chloride per mol of compound (M).

9. Process according to claim 1, wherein the organoaluminum compound is a trialkylaluminum in which the alkyl chains are linear and contain from 1 to 18 carbon atoms.

10. Process according to claim 1, wherein a polymerization process is carried out in which the polymer is generated directly in the form of particles.

11. Process according to claim 10, wherein the polymerization process is a polymerization process in suspension in a hydrocarbon diluent which is liquid under the polymerization conditions.

12. Process according to claim 10 to wherein the polymerization is carried out at a temperature of between 60° and 120° C.

13. Process according to claim 1, wherein compound (T) is a titanium tetraalkoxide.

14. Process according to claim 1, wherein the organoaluminum compound is a trialkylaluminum in which the alkyl chains are linear and contain from 1 to 18 carbon atoms.

15. Process according to claim 1, wherein the temperature of the reaction medium is maintained at between 30° and 65° C.

16. Process according to claim 1, wherein the amounts of compounds (T) and (M) employed to prepare the solid catalytic complexes are such that the ratio of the amount of titanium to the amount of magnesium is between 0.025 and 5 gram atoms titanium/gram atom of magnesium; and the amounts of compound (M) and organoaluminum chloride (A) employed are such that the ratio of the amount of organoaluminum chloride to the amount of compound (M) is between 1 and 20 moles of organoaluminum chloride per mole of compound (M).

17. Process according to claim 1, wherein the compounds (M) and (T) are both selected from alkoxides.

18. Process according to claim 17, wherein the organoaluminum compound is a trialkylaluminum in which the alkyl chains are linear and contain from 1 to 18 carbon atoms.

19. Process according to claim 17, wherein the temperature of the reaction medium is maintained at between 30° and 65° C.

20. Process according to claim 17, wherein the amounts of compounds (T) and (M) employed to prepare the solid catalytic complexes are such that the ratio of the amount of titanium to the amount of magnesium is between 0.025 and 5 gram atoms titanium/gram atom of magnesium; and the amounts of compound (M) and organic aluminum chloride (A) employed are such that the ratio of the amount of organoaluminum chloride to the amount of compound (M) is between 1 and 20 moles of organoaluminum chloride per mole of compound (M).

21. Process according to claim 1, wherein compound (M) is magnesium ethylate, compound (T) is titanium tetrabutylate and the organoaluminum chloride is isobutylaluminum dichloride.

22. Process according to claim 21, wherein the organoaluminum compound is a trialkylaluminum in which the alkyl chains are linear and contain from 1 to 18 carbon atoms.

23. Process according to claim 21, wherein the temperature of the reaction medium is maintained at between 30° and 65° C.

24. Process according to claim 21, wherein the amounts of compounds (T) and (M) employed to prepare the solid catalytic complexes are such that the ratio of the amount of titanium to the amount of magnesium is between 0.025 and 5 gram atoms titanium/gram atom of magnesium; and the amounts of compound (M) and organoaluminum chloride (A) employed are such that the ratio of the amount of organoaluminum chloride to the amount of compound (M) is between 1 and 20 moles of organoaluminum chloride per mole of compound (M).

25. Process for the preparation of solid catalyst complexes which comprises reacting together:
(1) at least one compound (M) selected from organic oxygen-containing magnesium compounds which only contain metal/oxygen/organic radical bonds,
(2) at least one compound (T) selected from organic oxygen-containing titanium compounds having the general formula $(TiO_x(OR)_{4-2x})_n$ in which R represents an organic radical, x is a number such that $0 \leq x \leq 1.5$ and n is an integer, and
(3) at least one aluminum halide (A) which is an organoaluminum chloride of the general formula $AlR_nCl_{3-n}$ in which R is an isobutyl radical and n is 1, with the aluminum halide (A) being employed at the end of the preparation.

26. Solid catalyst complexes for the polymerization of ethylene, which complexes are prepared by reacting together:
(1) at least one compound (M) selected from organic oxygen-containing magnesium compounds which only contain metal/oxygen/organic radical bonds with
(2) at least one compound (T) selected from organic oxygen-containing titanium compounds having the general formula $(TiO_x(OR)_{4-2x})_n$ in which R represents an organic radical, x is a number such that $0 \leq x \leq 1.5$ and n is an integer, and with
(3) at least one aluminum halide (A) which is an organoaluminum chloride of the general formula $AlR_nCl_{3-n}$ in which R is an isobutyl radical and n is 1, with the aluminum halide (A) being employed at the end of the preparation.

* * * * *